(12) United States Patent
Leffelman (10) Patent No.: US 7,437,991 B1
(45) Date of Patent: Oct. 21, 2008

(54) SYSTEM FOR PRESSING AND VACUUM TREATMENT OF CHEESE SOLIDS

(75) Inventor: Ricky Leffelman, Grantsburg, WI (US)

(73) Assignee: D. R. Tech, Inc., Grantsburg, WI (US)

( * ) Notice: Subject to any disclaimer, the term of this patent is extended or adjusted under 35 U.S.C. 154(b) by 774 days.

(21) Appl. No.: 10/995,740

(22) Filed: Nov. 22, 2004

Related U.S. Application Data (60) Provisional application No. 60/527,594, filed on Dec. 5, 2003.

(51) Int. Cl.
*A01J 25/11* (2006.01)

(52) U.S. Cl. .............................. 99/454; 99/458; 425/85; 425/347

(58) Field of Classification Search .................. 99/454, 99/458; 425/85, 347; 426/583, 478
See application file for complete search history.

(56) References Cited

U.S. PATENT DOCUMENTS

| | | | |
|---|---|---|---|
| 3,568,316 A * | 3/1971 | Hensel | 99/458 |
| 3,616,536 A * | 11/1971 | Stenne | 99/455 |
| 4,152,101 A * | 5/1979 | Charles | 425/85 |
| 4,184,825 A * | 1/1980 | Wolf | 425/85 |
| 4,289,793 A * | 9/1981 | Gustafson et al. | 426/491 |
| 4,608,006 A * | 8/1986 | Rijpkema et al. | 425/347 |
| 4,817,515 A * | 4/1989 | Bjerre et al. | 99/454 |
| 4,942,052 A * | 7/1990 | Posdal | 426/512 |
| 5,001,972 A * | 3/1991 | Greenfield et al. | 99/454 |
| 5,082,681 A * | 1/1992 | Barlow et al. | 426/495 |
| 5,094,873 A * | 3/1992 | Kerrigan et al. | 426/582 |
| 5,209,943 A * | 5/1993 | Pittelko | 426/582 |
| 5,404,802 A * | 4/1995 | Millerbernd et al. | 99/454 |
| 5,783,236 A * | 7/1998 | Meibach et al. | 426/36 |
| 6,482,458 B2 * | 11/2002 | Zantinge | 426/512 |

* cited by examiner

*Primary Examiner*—Anthony Weier
(74) *Attorney, Agent, or Firm*—Tipton L. Randall (57) ABSTRACT

A system for pressing and vacuum treatment of cheese solids is disclosed. The system includes a device for continuously treating loaded cheese solids containers with mechanical pressure and vacuum during movement of the containers in a circular path. Preferably, mechanical pressure and vacuum treatment are applied simultaneously to the loaded cheese solids containers.

19 Claims, 7 Drawing Sheets

SYSTEM FOR PRESSING AND VACUUM TREATMENT OF CHEESE SOLIDS

CROSS-REFERENCE TO RELATED APPLICATIONS, IF ANY

This application claims the benefit under 35 U.S.C. §119 (e) of provisional application Ser. No. 60/527,594, filed 5 Dec., 2003. Application Ser. No. 60/527,594 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a system for pressing and vacuum treatment of cheese solids and, more particularly, to a system for simultaneous pressing and vacuum treating cheese solids.

2. Background Information

Cheese making is an ancient art that man has practiced for many thousands of years. The basic cheese making process has changed very little from early times, although various improvements have been developed to provide a more uniform, consistent product. In general, animal milk is processed to produce a solid cheese curd and a liquid portion, termed whey. The cheese curd solids are collected and pressed into a suitable container to remove air space and extract the residual liquid whey from the solids. The pressed cheese solids are formed into wheels or blocks, covered with a suitable wrapping material, and aged to develop a particular texture and/or flavor.

Applicant has devised a system for simultaneously pressing the cheese solids into a compacted mass and applying a vacuum to the compressed cheese solids to remove residual whey liquid therefrom.

SUMMARY OF THE INVENTION

The invention is directed to a system for simultaneously pressing the cheese solids into a compacted mass and applying a vacuum to the compressed cheese solids to remove residual whey liquid. The pressing and vacuum treatment system for cheese solids includes a carousel member rotatable about a vertical central axis. A plurality of horizontal carrier tray members is secured to the carousel member, with each carrier tray member adapted for accepting at least one cheese solids perforated container with cheese solids therein. The container has a top opening with an associated container cover fitting therein. A plurality of vacuum plenum members is provided, with each plenum associated with a carrier tray member and movably positioned there above. Each vacuum plenum member has an open bottom adapted for forming a fluid tight seal with the associated carrier tray member and providing a closed volume there between. There is a first ram member attached to an exterior surface of each plenum member opposite the associated carrier tray member, with each first ram member operable to raise the attached plenum member and lower the attached plenum member into contact with the associated carrier tray member. At least one second ram member is positioned atop each plenum member, the at least one second ram member including a movable rod portion which is sealingly movable within an aperture in the plenum member. The rod portion includes an end portion adapted for applying pressure to a container cover fitted into the top opening of a cheese solids perforated container to compress cheese solids therein. A vacuum source selectively applies a vacuum to the closed volume formed by each plenum member which is sealingly positioned on an associated carrier tray member secured to the carousel member. A third ram member rotates the carousel member.

In operation of the system, a cheese solids perforated container, containing cheese solids and an associated container cover member fitted into the top opening thereof, is positioned on a carrier tray member at a carousel member entrance station. The carousel member rotates in a selected direction while an associated vacuum plenum member descends to form a fluid tight seal with the carrier tray member. The at least one second ram member's rod portion moves to apply pressure to the container cover member fitted into the top opening of the cheese solids perforated container to compress cheese solids therein and expel whey liquid therefrom, via the perforations therein. The vacuum source selectively applies a vacuum to the closed volume formed by each plenum member, which is sealingly positioned on an associated carrier tray member to further expel whey liquid from the cheese solids. The vacuum plenum member then ascends from contact with the carrier tray member, and the cheese solids container with compacted cheese solids therein, with the container cover member thereon, is removed from the carrier tray member at a carousel member exit station adjacent the entrance station thereof. The system of the present invention provides for quick processing of the cheese solids with minimum handling of cheese solids containers by the operator.

DESCRIPTION OF THE EMBODIMENTS

Nomenclature

10 Pressing and Vacuum Treatment System
15 Carousel Member

Figure 1:
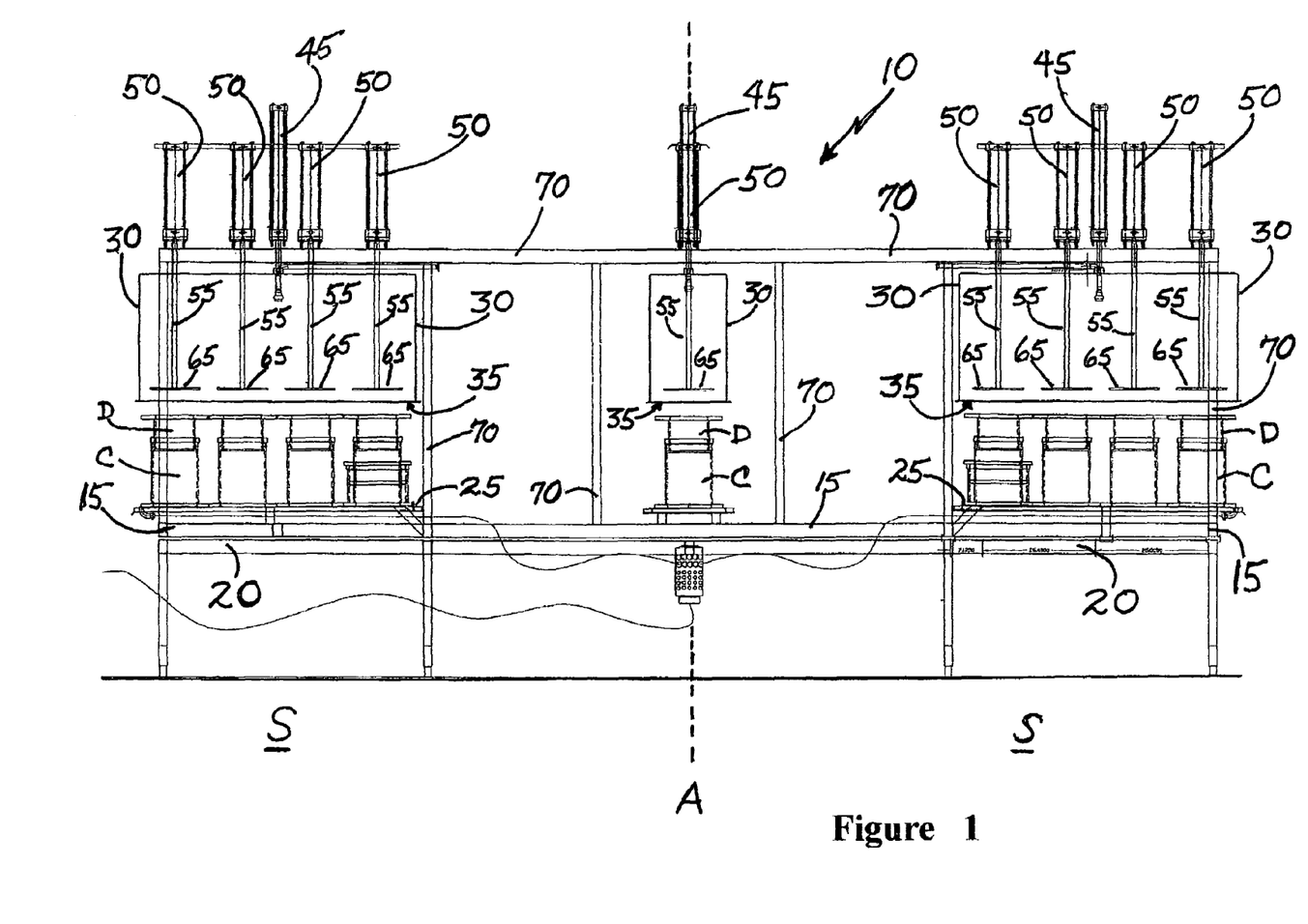
FIG. 1 is a cross sectional view of the system for pressing and vacuum treatment of cheese solids of the present invention.

20 Support Frame Member
25 Carrier Tray Members
30 Vacuum Plenum Members
35 Open Bottom of Plenum Member
40 Gasket Member
45 First Pneumatic Ram Members
50 Second Pneumatic Ram Members
55 Rod Portion of Second Ram Member
60 Apertures in Plenum Member
62 Seal Member for Rod Portion
65 End Section of Rod Portion
70 Carousel Frame Member
75 Vacuum Pump Member
80 Vacuum Manifold Member
85 Flexible Vacuum Conduits
90 Valve Members
95 Third Pneumatic Ram Member
A Axis of Rotation
C Cheese Solids Container
D Cover of Container
E Entrance Station of Carousel
X Exit Station of Carousel
S Support Surface Construction Referring to FIG. 1, the system 10 for pressing and vacuum treatment of cheese solids is shown in cross section. The system 10 includes a carousel member 15 rotatable about a vertical central axis A. A stationary support frame 20 elevates the carousel member 15 above a support surface S, with the carousel member 15 rotating relative to the support frame 20. The support frame 20 provides standing access to the system 10 by the operator during the processing of the cheese solids. A plurality of horizontal carrier tray members 25 is secured to the carousel member 15, with each carrier tray member 25 adapted for accepting at least one cheese solids perforated container C with cheese solids therein. The perforated container C has a top opening with an associated container cover D fitting therein. The perforated containers C, with an associated container cover D, are widely used in the cheese making industry, and are available from several sources, including Laude BD, headquartered in the Netherlands. The perforated containers C and the container covers D are fabricated from a synthetic polymeric resin and the walls contain numerous small pores or perforations for passing liquid there through.

Figure 2:
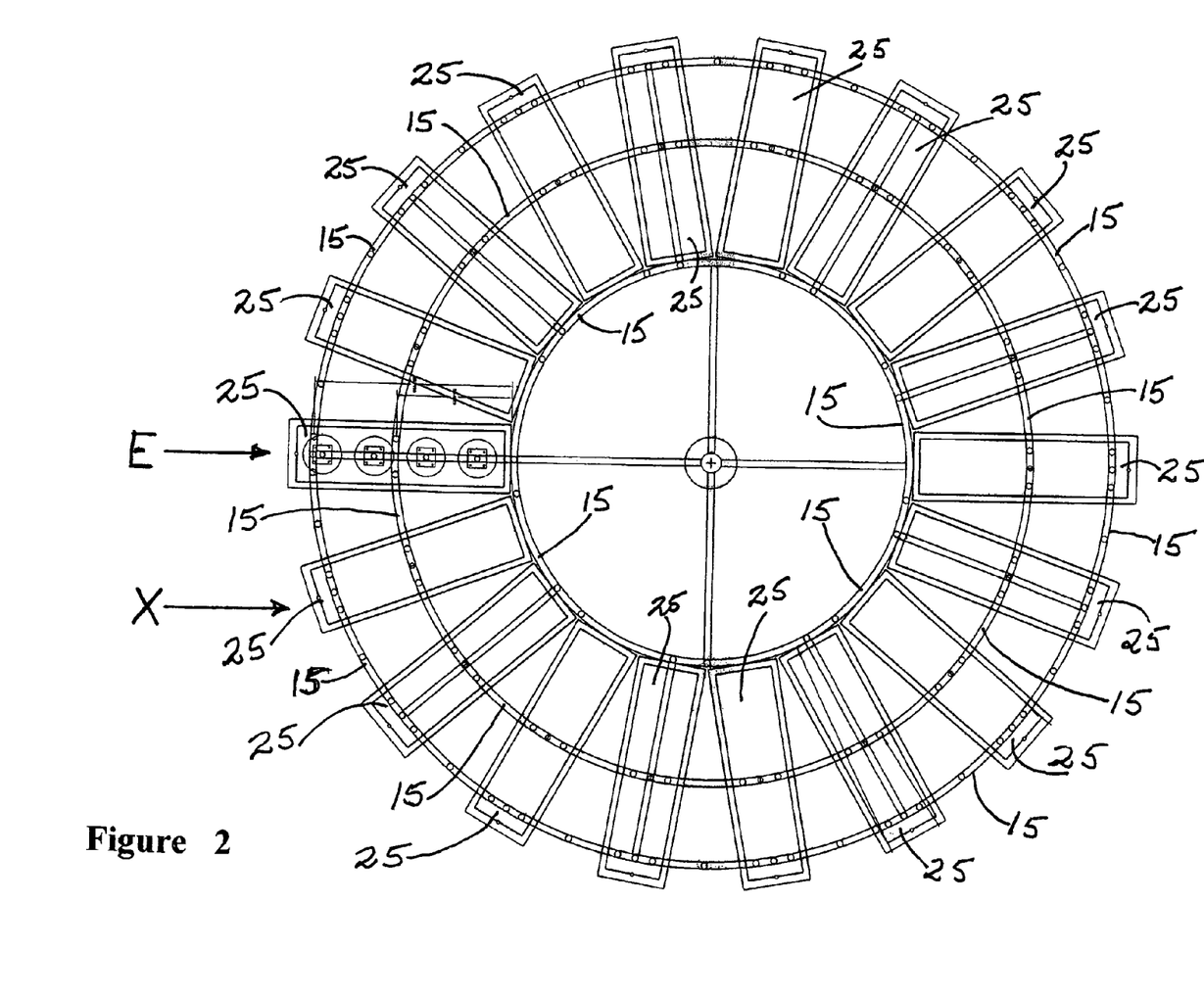
FIG. 2 is a top plan view of the carrier tray members secured to the carousel member of the system for pressing and vacuum treatment of cheese solids of the present invention.

In the present embodiment of the invention, eighteen carrier tray members 25 are symmetrically positioned on the circular carousel member 15, as illustrated in FIG. 2, showing a top view of only the carousel member 15 and carrier tray members 25. Preferably, the carrier tray members 25 are rectangular to accommodate several cheese solids perforated containers C, as illustrated in FIG. 1.

Referring again to FIG. 1, the system 10 includes a plurality of vacuum plenum members 30, in this embodiment eighteen such members 30, with each plenum member 30 associated with a carrier tray member 25 and movably positioned above the associated carrier tray member 25. Each vacuum plenum member 30 has an open bottom 35, preferably rectangular in shape, with an encircling, pliable, gasket member 40 there around. The gasket member 40 assists in forming a fluid tight seal with the associated carrier tray member 25. A first pneumatic ram member 45 is attached to an exterior surface of each plenum member 30 opposite the associated carrier tray member 25. Each first pneumatic ram member 45 is operable to raise the attached plenum member 30 and lower the attached plenum member 30 into contact with the associated carrier tray member 25 to form a closed volume therebetween. Pneumatic ram members 45 are preferred to hydraulic ram members to preclude possible contamination of the cheese solids by leaking hydraulic fluid. The plenum members 30 are shown in the elevated or "load" position in FIG. 1, where the loaded cheese solids containers C, with container covers D, are positioned on the carrier tray members 25.

Figure 5:
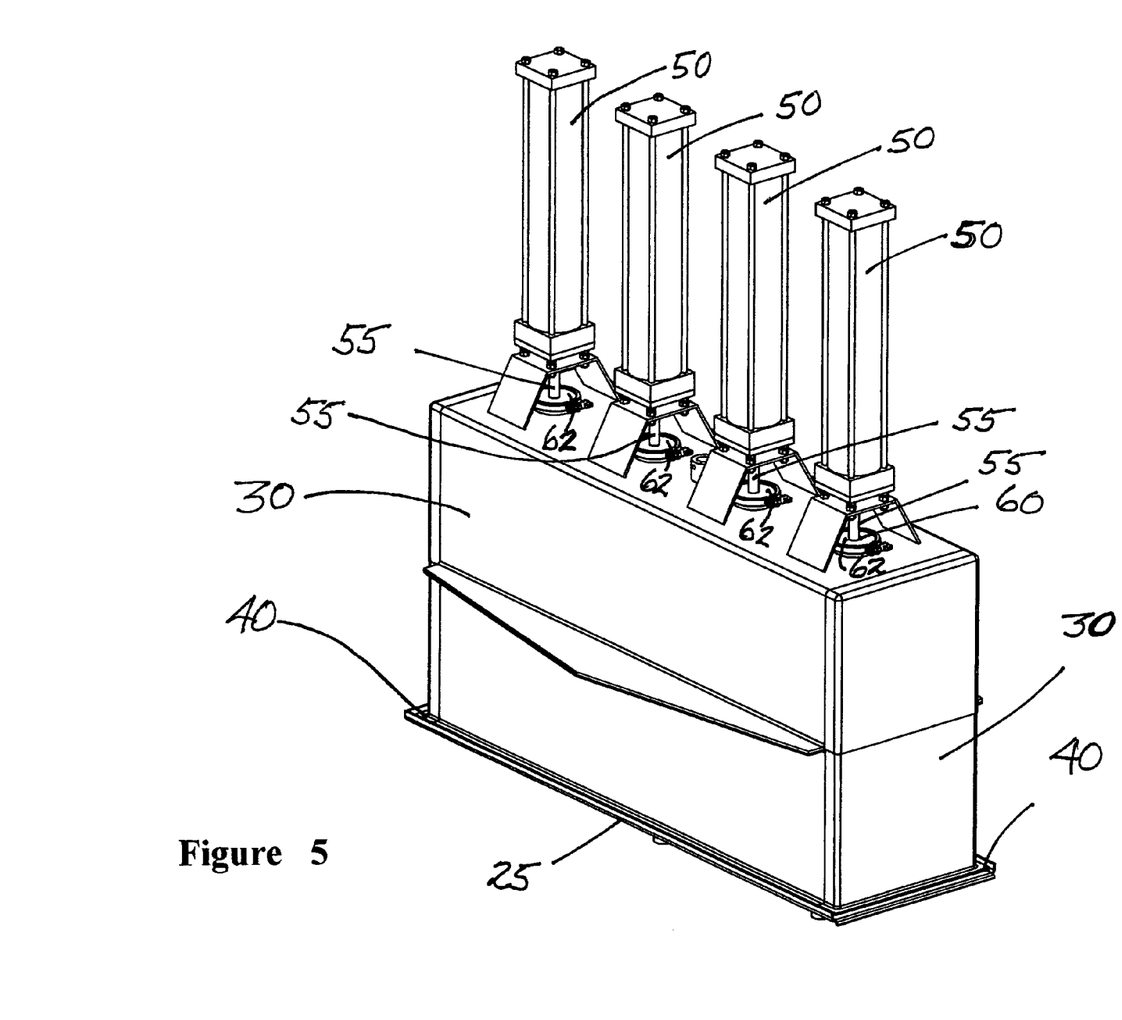
FIG. 5 is a perspective view of a vacuum plenum member with second ram members of the system for pressing and vacuum treatment of cheese solids of the present invention.
Figure 6:
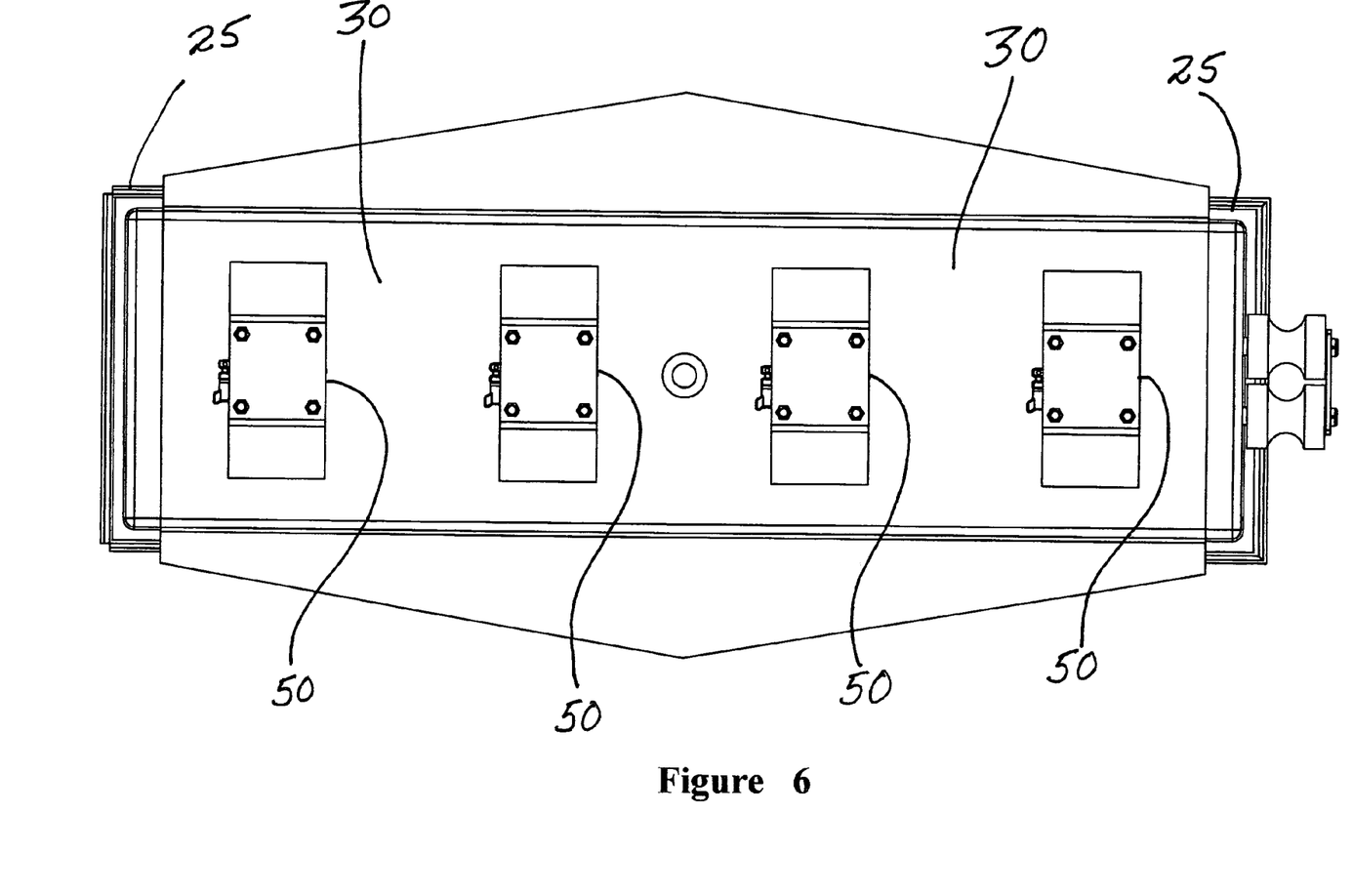
FIG. 6 is a top plan view of a vacuum plenum member with second ram members of the system for pressing and vacuum treatment of cheese solids of the present invention.

At least one second pneumatic ram member 50 is positioned atop each plenum member 30. The at least one second pneumatic ram member 50 includes a movable rod portion 55 sealingly movable within an aperture 60 in the closed top of the plenum member 30. A seal member 62 mounted in the aperture 60 provides a seal with the moveable rod portion 55 of the at least one second pneumatic ram member 50. The rod portion 55 has an end portion 65 adapted for applying pressure to the container cover D fitted into the top opening of a cheese solids perforated container C to compress cheese solids therein. Again, pneumatic ram members 50 are preferred to hydraulic ram members to preclude possible contamination of the cheese solids by leaking hydraulic fluid. In the present embodiment of the system 10, each plenum member 30 has four pneumatic ram members 50 positioned at the closed top thereof. The four rod end portions 65 are positioned to contact the container covers D of the four corresponding cheese solids perforated containers C to compress cheese solids therein. The relationship of these elements is best seen in FIG. 1. A detailed perspective view of a plenum member 30 with four pneumatic ram members 50 positioned at the closed top is shown in FIG. 5, while a top view of these elements is shown in FIG. 6.

Figure 3:
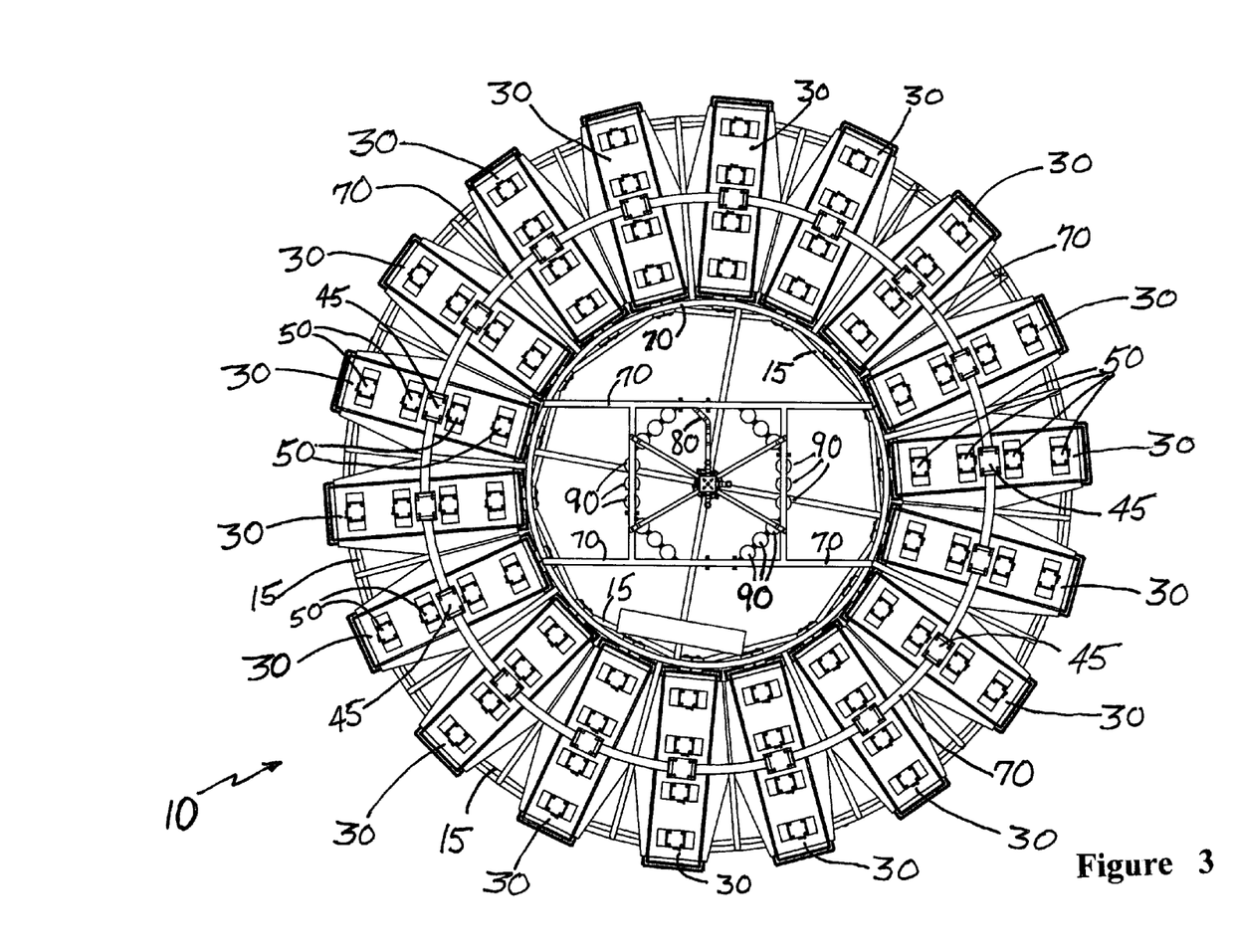
FIG. 3 is a top plan view of the system for pressing and vacuum treatment of cheese solids of the present invention.
Figure 4:
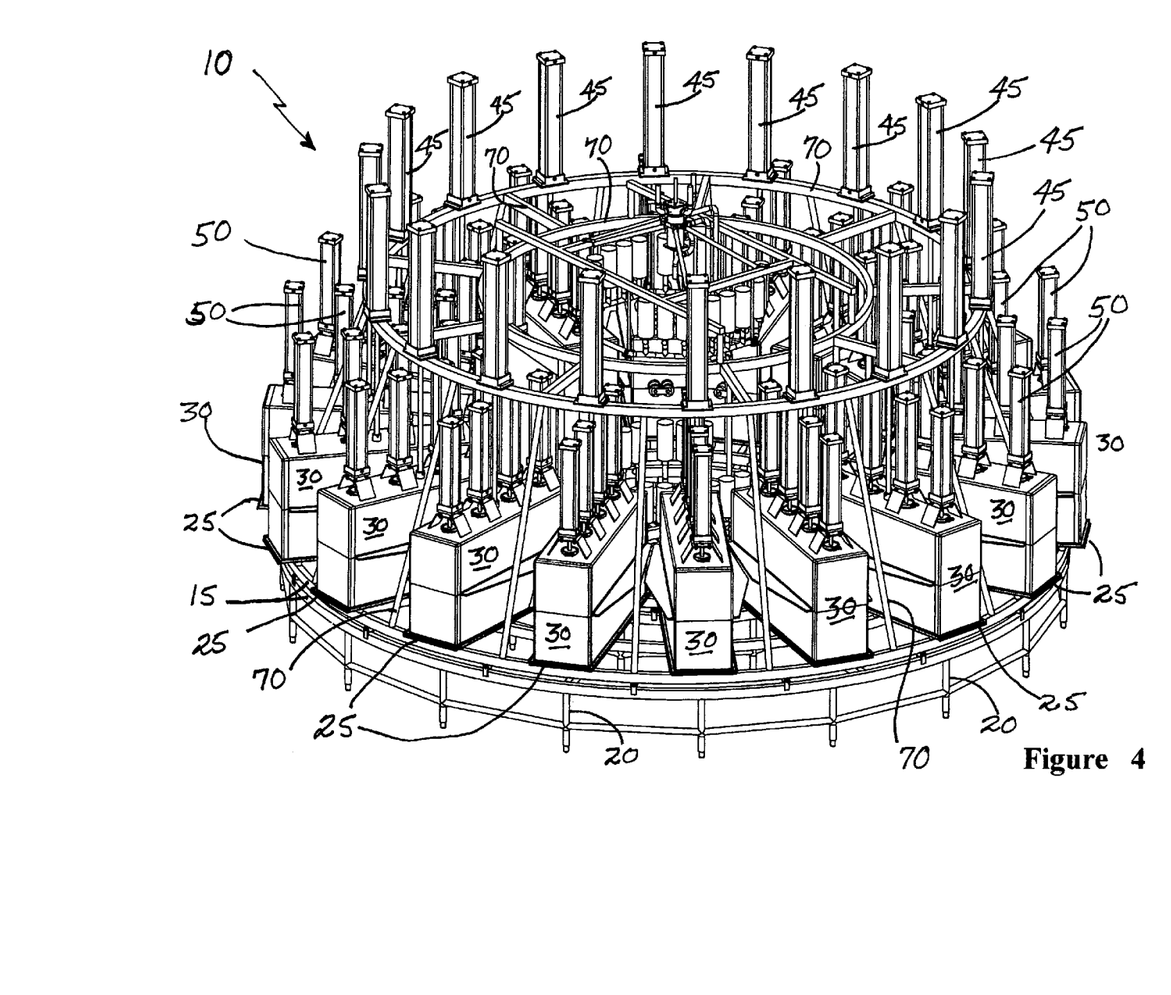
FIG. 4 is a perspective view of the system for pressing and vacuum treatment of cheese solids of the present invention.

Referring now to FIGS. 3 and 4, a carousel frame member 70 is attached to the carousel member 15, with the frame member 70 supporting each first pneumatic ram member 45, as well as each at least one second pneumatic ram member 50 and each associated vacuum plenum member 30 positioned above each carrier tray member 15. The perspective view of FIG. 4 shows all of the vacuum plenum members 30 in contact with each associated carrier tray member 15. The total number of plenum members 30 and associated carrier tray members 25 can range from about eight (8) to about forty (40) or more, depending on the needs of the user and the available space to house the carousel member 15.

A vacuum source is present for selectively applying a vacuum to the closed volume formed by each plenum member 30 sealingly positioned on an associated carrier tray member 25 secured to the carousel member 15. In a preferred embodiment, the vacuum source includes a vacuum pump 75 in fluid communication with a vacuum manifold 80 adjacent each carrier tray member 25, with a flexible vacuum conduit 85 connecting each carrier tray member 25 to the vacuum manifold 80. Most preferably, a valve member 90 is mounted between each flexible vacuum conduit 85 and the vacuum manifold 80. Each valve member 90 is controlled for selectively applying a vacuum to the closed volume formed by each plenum member 30 and associated carrier tray member 25, for a selected time duration. Each flexible vacuum conduit 85 is connected to an aperture in one carrier tray member 25 to evacuate air from the closed volume containing the loaded cheese solids perforated containers C.

Figure 7:
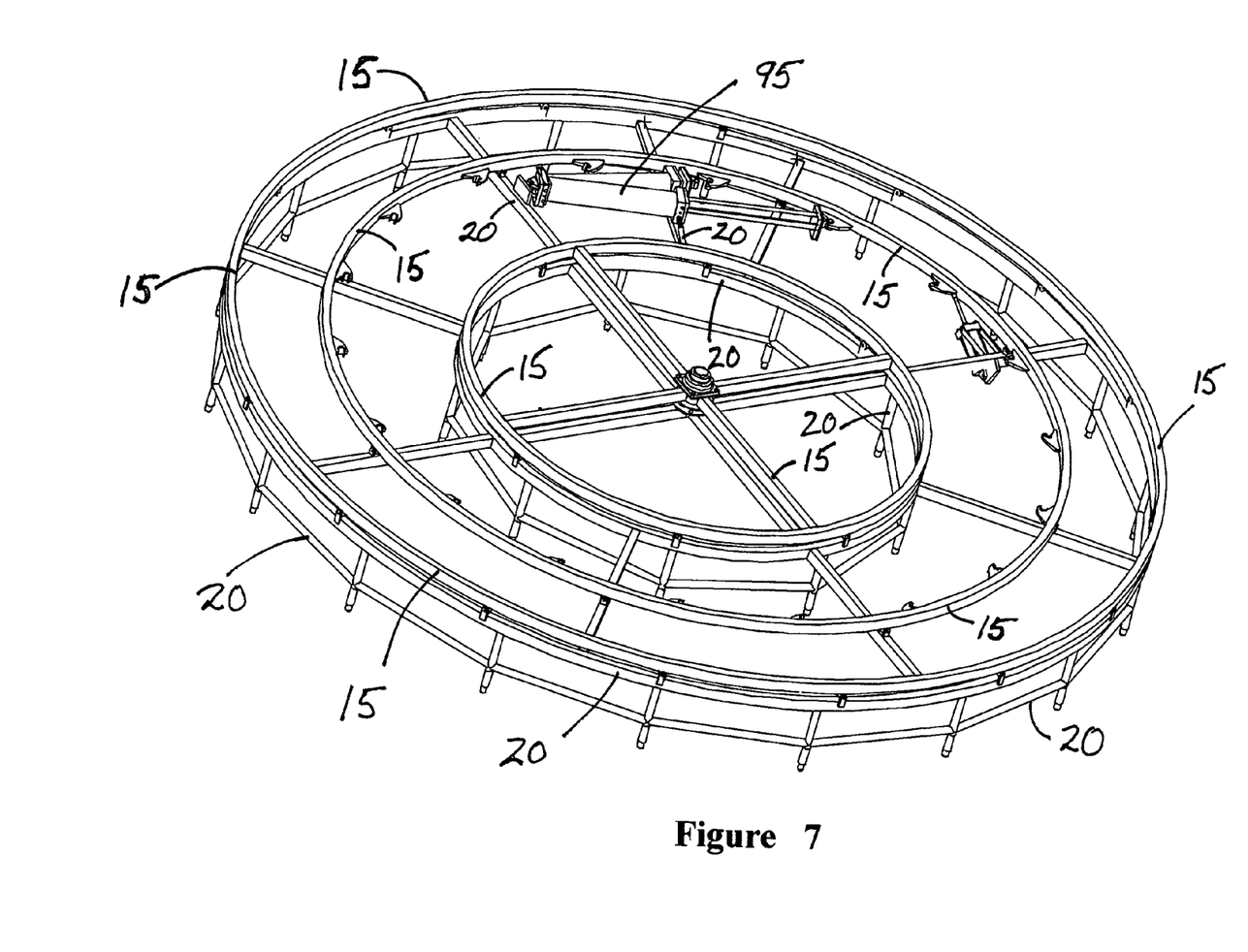
FIG. 7 is a perspective view of the carousel member and the support frame member with the pneumatic ram member that indexes the carousel member relative to the support frame member of the present invention.

A third ram member 95 rotates the carousel member 15 and attached frame member 70 during operation of the system 10. The third ram member 95 is preferably a pneumatic ram member, not a hydraulic ram member, to preclude possible contamination of the cheese solids by leaking hydraulic fluid. The third ram member 95 is best seen in FIG. 7. Extension of the third ram member 95 rotates the carousel member 15 a selected distance, then the carousel member 15 stops while the third ram member 95 retracts. Extension of the third ram member 95 again rotates the carousel member 15 a selected distance, then the carousel member 15 again stops while the third ram member 95 retracts. This movement of the carousel member 15 is termed "indexing" and is employed in the loading and unloading of the cheese solids containers C on the pressing and vacuum treatment system 10.

In operation of the system 10, a cheese solids perforated container C containing cheese solids, with an associated container cover D fitted into the top opening of the container C, is positioned on a carrier tray member 25 at a carousel member entrance station E, with an associated vacuum plenum member 30 elevated above the tray member 25 by the first pneumatic ram member 45. The carousel member 15 rotates, or indexes, in a selected direction while the associated vacuum plenum member 30 descends to form a fluid tight seal with the carrier tray member 25 and produce a closed volume containing the loaded cheese solids container C. The at least one second ram member's rod portion 55 moves to apply pressure to the container cover D fitted into the top opening of the cheese solids perforated container C to compress cheese solids therein and expel whey liquid therefrom, via the perforations in the container C. The vacuum source selectively applies a vacuum to the closed volume, formed by the plenum member 30 sealingly positioned on an associated carrier tray member 25, to further expel whey liquid from the cheese solids via the perforations in the container C. Excess liquid whey is drawn off from the carrier tray member 25 via the vacuum conduit 85 connected thereto. The vacuum plenum member 30 then ascends from contact with the carrier try member 25. The cheese solids container C with compacted cheese solids therein, and the container cover D thereon, is then removed from the carrier tray member 25 at a carousel member's exit station X adjacent the carousel member's entrance station E. The empty carrier tray member 25 moves, or indexes, to the adjacent entrance station E and receives additional cheese solids perforated containers C containing cheese solids, with an associated container cover D fitted into the top opening of the container C, and the treatment process is repeated on each batch of loaded containers C.

Thus, the cheese solids perforated containers C make one revolution around the carousel member 15 during the pressing and vacuum treatment process and are removed at an exit point X adjacent the entrance point E on the carousel member 15. The system 10 of the present invention provides for quick processing of the cheese solids with minimum handling of containers by the operator during the pressing and vacuum treatment process.

Also disclosed is a method for pressing and vacuum treatment of cheese solids. The method includes the steps of providing an open top, cheese solids perforated container with an associated container cover fitting into the top opening thereof. Cheese solids are placed into the cheese solids perforated container and the associated container cover positioned in the top opening thereof to form a loaded cheese solids container. A pressing and vacuum treatment system for cheese solids is provided. The system includes; (i) a carousel member rotatable about a vertical central axis; (ii) a plurality of horizontal carrier tray members secured to the carousel member, each carrier tray member adapted for accepting at least one loaded cheese solids container; (iii) a plurality of vacuum plenum members, each plenum member associated with a carrier tray member and movably positioned there above, each vacuum plenum member having an open bottom adapted for forming a fluid tight seal with the associated carrier tray member and a closed volume there between; (iv) a first ram member attached to an exterior surface of each plenum member opposite the associated carrier tray member, each first ram member operable to raise the attached plenum member and lower the attached plenum member into contact with the associated carrier tray member; (v) at least one second ram member positioned atop each plenum member, the at least one second ram member including a movable rod portion sealingly movable within an aperture in the plenum member, the rod portion having an end portion adapted for applying pressure to a container cover of a loaded cheese solids container to compress cheese solids therein; (vi) a vacuum source for selectively applying a vacuum to the closed volume formed by each plenum member sealingly positioned on an associated carrier tray member secured to the carousel member; and (vii) a third ram member for rotating the carousel member. A loaded cheese solids container is positioned on a carrier tray member at a carousel member entrance station. The carousel member rotates in a selected direction while an associated vacuum plenum member descends to form a fluid tight seal with the carrier tray member. The at least one second ram member's rod portion moves to apply pressure to the container cover member of the loaded cheese solids container to compress cheese solids therein and expel whey liquid therefrom, via the perforations therein. A vacuum is applied from a vacuum source, for a selected duration, to the closed volume formed by the plenum member sealingly positioned on an associated carrier tray member to further expel whey liquid from the cheese solids. The vacuum plenum member is raised from contact with the carrier try member, and the loaded cheese solids container, with compacted cheese solids therein, is removed from the carrier tray member at a carousel member exit station adjacent the carousel member's entrance station.

While the invention has been particularly shown and described with reference to preferred embodiments thereof, it will be understood by those skilled in the art that various changes in form and details may be made therein without departing from the spirit and scope of the invention.

I claim:

1. A pressing and vacuum treatment system for cheese solids comprising:

a carousel member rotatable about a vertical central axis;

a plurality of horizontal carrier tray members secured to the carousel member, each carrier tray member adapted for accepting at least one cheese solids perforated container with cheese solids therein, the container having a top opening with an associated container cover fitting therein;

a plurality of vacuum plenum members, each plenum member associated with a carrier tray member and movably positioned there above, each vacuum plenum member having an open bottom adapted for forming a fluid tight seal with the associated carrier tray member and a closed volume there between;

a first ram member attached to an exterior surface of each plenum member opposite the associated carrier tray member, each first ram member operable to raise the attached plenum member and lower the attached plenum member into contact with the associated carrier tray member;

at least one second ram member positioned atop each plenum member, the at least one second ram member including a movable rod portion sealingly movable within an aperture in the plenum member, the rod portion having an end portion adapted for applying pressure to a container cover fitted into the top opening of a cheese solids perforated container to compress cheese solids therein;

a vacuum source for selectively applying a vacuum to the closed volume formed by each plenum member sealingly positioned on an associated carrier tray member secured to the carousel member; and a third ram member for rotating the carousel member, whereby a cheese solids perforated container containing cheese solids, with an associated container cover member fitted into the top opening thereof, is positioned on a carrier tray member at a carousel member entrance station, the carousel member rotating in a selected direction while an associated vacuum plenum member descends to form a fluid tight seal and a closed volume with each carrier tray member, the at least one second ram member's rod portion moves to apply pressure to the container cover member fitted into the top opening of the cheese solids perforated container to compress cheese solids therein and expel whey liquid therefrom via the perforations therein, the vacuum source selectively applying a vacuum to the closed volume formed by each plenum member sealingly positioned on an associated carrier tray member to further expel whey liquid from the cheese solids, the vacuum plenum member ascending from contact with the carrier try member, and the cheese solids container with compacted cheese solids therein, with the container cover member thereon, is removed from the carrier tray member at a carousel member exit station adjacent the entrance station thereof.

2. The pressing and vacuum treatment system for cheese solids of claim 1, further including a stationary support frame elevating the carousel member above a support surface.

3. The pressing and vacuum treatment system for cheese solids of claim 1, wherein the carrier tray members are rectangular.

4. The pressing and vacuum treatment system for cheese solids of claim 1, further including a frame member attached to the carousel member, the frame member supporting each first ram member and each at least one second ram member and each associated vacuum plenum member above each carrier tray member.

5. The pressing and vacuum treatment system for cheese solids of claim 1, wherein the vacuum plenum members include a rectangular open bottom for forming a fluid tight seal and a closed volume with the associated carrier tray member.

6. The pressing and vacuum treatment system for cheese solids of claim 1, wherein the vacuum plenum members each include a pliable gasket member encircling the open bottom thereof, for forming a fluid tight seal and a closed volume with the associated carrier tray member.

7. The pressing and vacuum treatment system for cheese solids of claim 1, wherein the first ram member, the at least one second ram member and the third ram member are pneumatic ram members.

8. The pressing and vacuum treatment system for cheese solids of claim 1, wherein the vacuum source includes a vacuum pump in fluid communication with a vacuum manifold adjacent each carrier tray member, with a flexible vacuum conduit connecting each closed volume, formed by a vacuum plenum member and a carrier try member, to the vacuum manifold.

9. The pressing and vacuum treatment system for cheese solids of claim 8, further including a valve member between each flexible vacuum conduit and the vacuum manifold, each valve member controlled for selectively applying a vacuum to each closed volume, formed by a vacuum plenum member and a carrier try member, for a selected duration of time.

10. A pressing and vacuum treatment system for cheese solids comprising:

a carousel member rotatable about a vertical central axis;

a plurality of horizontal carrier tray members secured to the carousel member, each carrier tray member adapted for accepting at least one cheese solids perforated container with cheese solids therein, the container having a top opening with an associated container cover fitting therein;

a plurality of vacuum plenum members, each plenum member associated with a carrier tray member and movably positioned there above, each vacuum plenum member having an open bottom adapted for forming a fluid tight seal with the associated carrier tray member and a closed volume there between;

a first pneumatic ram member attached to an exterior surface of each plenum member opposite the associated carrier tray member, each first pneumatic ram member operable to raise the attached plenum member and lower the attached plenum member into contact with the associated carrier tray member;

at least one second pneumatic ram member positioned atop each plenum member, the at least one second pneumatic ram member including a movable rod portion sealingly movable within an aperture in the plenum member, the rod portion having an end portion adapted for applying pressure to a container cover fitted into the top opening of a cheese solids perforated container to compress cheese solids therein;

a frame member attached to the carousel member, the frame member supporting each first pneumatic ram member and each at least pneumatic one second ram member and each associated vacuum plenum member above each carrier tray member;

a vacuum source for selectively applying a vacuum to the closed volume formed by each plenum member sealingly positioned on an associated carrier tray member secured to the carousel member; and a third ram member for rotating the carousel member, whereby a cheese solids perforated container containing cheese solids, with an associated container cover member fitted into the top opening thereof, is positioned on a carrier tray member at a carousel member entrance station, the carousel member rotating in a selected direction while an associated vacuum plenum member descends to form a fluid tight seal and a closed volume with the carrier tray member, the at least one second ram member's rod portion moves to apply pressure to the container cover member fitted into the top opening of the cheese solids perforated container to compress cheese solids therein and expel whey liquid therefrom via the perforations therein, the vacuum source selectively applying a vacuum to the plenum member sealingly positioned on an associated carrier tray member to further expel whey liquid from the cheese solids, the vacuum plenum member ascending from contact with the carrier try member, and the cheese solids container with compacted cheese solids therein, with the container cover member thereon, is removed from the carrier tray member at a carousel member exit station adjacent the entrance station thereof.

11. The pressing and vacuum treatment system for cheese solids of claim 10, further including a stationary support frame elevating the carousel member above a support surface.

12. The pressing and vacuum treatment system for cheese solids of claim 10, wherein the carrier tray members are rectangular.

13. The pressing and vacuum treatment system for cheese solids of claim 10, wherein the vacuum plenum members include a rectangular open bottom for forming a fluid tight seal with the associated carrier tray member.

14. The pressing and vacuum treatment system for cheese solids of claim 10, wherein the vacuum plenum members each include a pliable gasket member encircling the open bottom thereof, for forming a fluid tight seal with the associated carrier tray member.

15. The pressing and vacuum treatment system for cheese solids of claim 10, wherein the vacuum source includes a vacuum pump in fluid communication with a vacuum manifold adjacent each carrier tray member, with a flexible vacuum conduit connecting each closed volume, formed by a vacuum plenum member and a carrier try member, to the vacuum manifold.

16. The pressing and vacuum treatment system for cheese solids of claim 15, further including a valve member between each flexible vacuum conduit and the vacuum manifold, each valve member controlled for selectively applying a vacuum to each closed volume, formed by a vacuum plenum member and a carrier try member, for a selected duration of time.

17. A pressing and vacuum treatment system for cheese solids comprising:
   a carousel member rotatable about a vertical central axis;
   a stationary support frame elevating the carousel member above a support surface;
   a plurality of horizontal carrier tray members secured to the carousel member, each carrier tray member adapted for accepting at least one cheese solids perforated container with cheese solids therein, the container having a top opening with an associated container cover fitting therein;
   a plurality of vacuum plenum members, each plenum member associated with a carrier tray member and movably positioned there above, each vacuum plenum member having an open bottom with an encircling, pliable, gasket member there around, adapted for forming a fluid tight seal with the associated carrier tray member and a closed volume there between;
   a first pneumatic ram member attached to an exterior surface of each plenum member opposite the associated carrier tray member, each first pneumatic ram member operable to raise the attached plenum member and lower the attached plenum member into contact with the associated carrier tray member;
   at least one second pneumatic ram member positioned atop each plenum member, the at least one second pneumatic ram member including a movable rod portion sealingly movable within an aperture in the plenum member, the rod portion having an end portion adapted for applying pressure to a container cover fitted into the top opening of a cheese solids perforated container to compress cheese solids therein;
   a frame member attached to the carousel member, the frame member supporting each first pneumatic ram member and each at least pneumatic one second ram member and each associated vacuum plenum member above each carrier tray member;
   a vacuum source for selectively applying a vacuum to the closed volume formed by each plenum member sealingly positioned on an associated carrier tray member secured to the carousel member; and
   a third ram member for rotating the carousel member and attached frame member,
   whereby a cheese solids perforated container containing cheese solids, with an associated container cover member fitted into the top opening thereof, is positioned on a carrier tray member at a carousel member entrance station, the carousel member rotating in a selected direction while an associated vacuum plenum member descends to form a fluid tight seal and a closed volume with the carrier tray member, the at least one second ram member's rod portion moves to apply pressure to the container cover member fitted into the top opening of the cheese solids perforated container to compress cheese solids therein and expel whey liquid therefrom via the perforations therein, the vacuum source selectively applying a vacuum to the plenum member sealingly positioned on an associated carrier tray member to further expel whey liquid from the cheese solids, the vacuum plenum member ascending from contact with the carrier try member, and the cheese solids container with compacted cheese solids therein, with the container cover member thereon, is removed from the carrier tray member at a carousel member exit station adjacent the entrance station thereof.

18. The pressing and vacuum treatment system for cheese solids of claim 17, wherein the vacuum source includes a vacuum pump in fluid communication with a vacuum manifold adjacent each carrier tray member, with a flexible vacuum conduit connecting each closed volume, formed by a vacuum plenum member and a carrier try member, to the vacuum manifold.

19. The pressing and vacuum treatment system for cheese solids of claim 18, further including a valve member between each flexible vacuum conduit and the vacuum manifold, each valve member controlled for selectively applying a vacuum to each closed volume, formed by a vacuum plenum member and a carrier try member, for a selected duration of time.

* * * * *